United States Patent [19]
Foye

[11] Patent Number: 5,251,815
[45] Date of Patent: Oct. 12, 1993

[54] SELF POWERED AND BALANCING AIR DAMPER

[75] Inventor: David M. Foye, La Crosse, Wis.

[73] Assignee: American Standard Inc., New York, N.Y.

[21] Appl. No.: 993,832

[22] Filed: Dec. 18, 1992

[51] Int. Cl.$^5$ ............................................ G05D 15/00
[52] U.S. Cl. .................................... 236/49.3; 236/51; 454/256
[58] Field of Search .................... 236/49.1, 49.3, 51; 165/16, 22; 454/229, 256, 258, 340; 137/486

[56] References Cited

U.S. PATENT DOCUMENTS

| | | | |
|---|---|---|---|
| 3,101,615 | 8/1963 | Pavone | 73/231 |
| 3,455,162 | 7/1969 | Michener et al. | 73/231 |
| 3,636,767 | 1/1972 | Duffy | 338/32 |
| 3,809,314 | 5/1974 | Engelke et al. | 236/49 |
| 3,817,452 | 6/1974 | Dean, Jr. | 236/49 |
| 3,876,138 | 4/1975 | Dean, Jr. | 236/49 |
| 3,878,718 | 4/1975 | Sugiyama et al. | 73/231 |
| 3,945,565 | 3/1976 | Lynch et al. | 236/49 |
| 4,040,564 | 8/1977 | Waeldner et al. | 236/49 |
| 4,047,662 | 9/1977 | Serratto | 236/49 |
| 4,061,266 | 12/1977 | Ley, Jr. et al. | 236/49 |
| 4,186,876 | 2/1980 | Clark et al. | 236/49 |
| 4,291,832 | 9/1981 | Ginn et al. | 236/49 |
| 4,406,397 | 9/1983 | Kamata et al. | 236/1 |
| 4,491,061 | 1/1985 | Nishizawa et al. | 98/34.6 |
| 4,500,034 | 2/1985 | Reese et al. | 236/49 |
| 4,553,696 | 11/1985 | Ichikawa et al. | 236/49 |
| 4,648,552 | 3/1987 | Carlson et al. | 236/49 |
| 4,749,000 | 6/1988 | Ring et al. | 137/219 |
| 4,749,001 | 6/1988 | Ring et al. | 137/219 |
| 4,775,133 | 10/1988 | Ring et al. | 251/129 |
| 4,838,310 | 6/1989 | Scott et al. | 251/129.04 X |
| 4,838,483 | 6/1989 | Nurczyk et al. | 236/49 |
| 4,921,164 | 5/1990 | Gotou et al. | 236/49.3 |
| 4,997,030 | 3/1991 | Goto et al. | 236/49.3 X |
| 5,004,149 | 4/1991 | Narikiyo et al. | 165/22 X |
| 5,114,070 | 5/1992 | Lilja et al. | 236/51 X |

OTHER PUBLICATIONS

Chapter 57, "Testing, Adjusting, and Balancing", 1987 HVAC Handbook.

*Primary Examiner*—Harry B. Tanner
*Attorney, Agent, or Firm*—William J. Beres; William O'Driscoll; Peter D. Ferguson

[57] ABSTRACT

An automatic air damper assembly for use with a building conditioned air system. The air damping assembly includes a duct section adapted for insertion into the duct work of the conditioned air system, a adjustable damper installed in the duct section, a sensor for sensing the volume of air flow through the duct and a controller coupled to the sensor. The controller compares the sensed volume of air flow through the duct section to a predetermined design volume of air flow and generates an output signal representative of the comparison of the two air flows. A motor receives the output signal from the controller. The actuator is operably coupled to the damper for actuation thereof responsive to said output signal to position the damper to achieve the design volume of air flow in the duct.

13 Claims, 3 Drawing Sheets

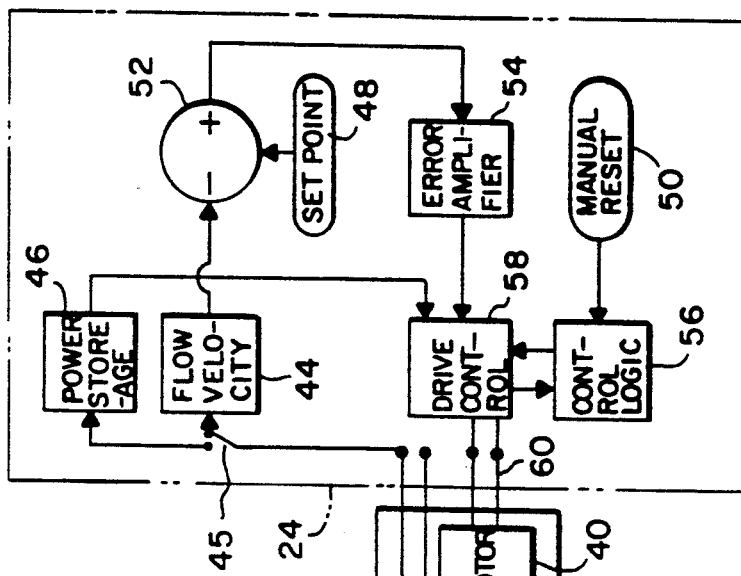
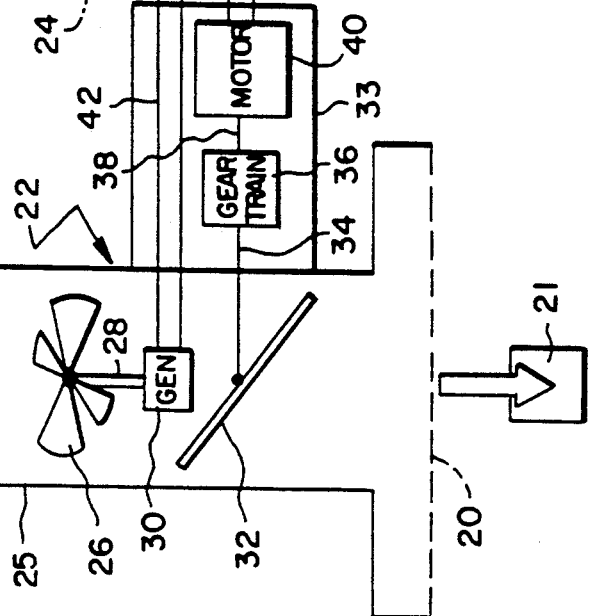
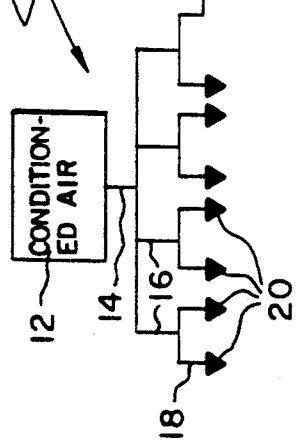

SELF POWERED AND BALANCING AIR DAMPER

TECHNICAL BACKGROUND

An air damper assembly with an on board control system is disclosed that is especially designed for use in automatically balancing a ventilation system in a building. More particularly, the disclosed air damper assembly provides for the automatic balancing of the air flow through individual terminals of a building ventilation system having a multitude of terminals servicing one or more zones of the building. The air damper assembly is self-powered as well as self-balancing.

BACKGROUND OF THE INVENTION

Duct systems used in the ventilated cooling and heating of a building are often constructed with a branched architecture. The main duct is the duct connected directly to the source of cooled or heated air and conveys the ventilation system's entire output of such air for distribution to the zones in the various spaces of the building. The submain duct is a duct conveying a portion of the main's air to two or more branches. A branch is a duct serving a single terminal, the terminal being the point where the conditioned air enters the zone that is to be cooled or heated. A zone may be a room or a portion of a room.

One type of ventilation system that is utilized with branched architecture duct systems is a variable air volume (VAV) system. VAV systems became frequently used in new construction during the 1970's when efforts were made to reduce ventilation system energy costs and to add independent zone temperature control. VAV systems are designed to supply only the volume of conditioned air to a space that is needed to satisfy the cooling or heating needs of the space. In such systems, the temperature of the conditioned air is maintained at a constant and the volume of conditioned air delivered to the space is varied depending on the cooling or heating demands.

VAV systems require balancing when first installed in new or remodeled building construction. Balancing a VAV system encompasses the proper proportioning of the overall air flow between all of the various terminals in the system. In particular, each individual terminal in a system is assigned a specified air flow according to the design of the ventilation system. As may be appreciated, the air flow at any one terminal is highly interdependent with all the other terminals, since all of the terminals are interconnected through the various branches, submains, and the main of the duct system. Accordingly, a variation of conditioned air pressure and volume at one terminal is felt in varying degrees in the air pressure measured at all the other terminals, and a change in air flow through one terminal causes a change in the air flow in all the other terminals that are on the duct system. A result of the interaction between air pressure and volume at the various terminals is that the process of balancing the ventilation system is a highly iterative one that may take an unacceptable amount of labor and time to accomplish upon initial installation of the VAV system. Necessary changes to the duct system during construction and adjustment for building tenants often aggravate this iterative process.

Conventional balancing of newly installed VAV systems and of modified or renovated systems is a manual process. A change is made at a terminal by adjusting a damper to either increase or decrease the volume of air flowing through the terminal. This adjustment is manually made by service personnel after consulting the design specifications and usually after listening to the concerns of the individuals that occupy the zone. Measurements must then be made at the terminal and at a representative number of other terminals to ascertain the effect of the change throughout the ventilation system. As previously indicated, this iterative process may go on for as long as a year through both heating and cooling seasons before a satisfactory balance is achieved.

The process of balancing a VAV system is a labor intensive activity. The dampers at the terminals are typically not readily accessible. Usually a ladder must be brought in and ceiling panels removed to gain access to the dampers. Considerable time is spent by service personnel determining what the damper change should be in the affected space and what the impact will be in other zones. It can be a very frustrating task. Adding to the frustration are the complaints of the occupants of the affected zone, since it is difficult for untrained occupants to accept the length of time required to get an air conditioning and heating system functioning properly. Additionally, occupants are justifiably irritated with the number of disruptions caused by service personnel when the dampers are adjusted and readjusted.

Obtaining an initial satisfactory balance is not the end of the balancing effort. Each building has a certain dynamic that requires constant attention to the airflow balance. Cooling and heating usage in individual spaces and zones changes. For instance additional people may be assigned to work in a certain space, or new heat generating equipment, such as computers and copying machines, may be installed. These changes and others affect the volume of conditioned air that is required to maintain the desired temperature in a space. Such changes require an alteration in the ventilation system balance and the previously described iterative process must again be undertaken.

A minimum cost, automatic balancing air damper assembly that could be used to automatically accomplish the initial balancing of a ventilation system in a newly constructed building and that would allow for automatic readjustment of the balance thereafter in response to changes in the usage of the building space would fulfill a long standing need in the industry. Additionally, it would be a great advantage if the automatic air damper were self-powered so as to avoid the cost and labor in providing power to the inaccessible damper assembly locations.

SUMMARY OF THE INVENTION

The present invention is an air damper assembly that automatically and iteratively sets the air flow in a terminal of a ventilation system without requiring repeated access to the damper assembly by maintenance personnel. An automatic air damper assembly in accordance with the present invention is installed in all, or a preselected number, of the ducts of a VAV system. The damper assembly includes a sensor to sense the volume of air flow in the duct, and a control system in communication with the sensor. The control system receives a signal proportional to the sensed volume of air flow and compares the received signal to a preselected setting that is representative of the desired air flow in the duct. The control system generates a command signal that is representative of a correction factor to adjust the damper of the damper assembly to achieve the desired air flow and the command signal is communicated to a powered actuator. The actuator is operably coupled to the damper and drives the damper to a new position responsive to the command received from the control system.

In a preferred embodiment, the sensor is an air driven turbine connected to an electrical generator. The turbine/generator set operates in two modes. In the unloaded mode, the generator is not connected to a significant electrical load. In this mode, the voltage output of the generator is proportional to the volume of air flow, and hence to the velocity of air flow, in the duct and provides a signal representative of actual air flow that can be compared to a signal representative of desired air flow. In the loaded mode, the generator is powered by the rotation of the turbine and the power produced is utilized to power the control system and actuator to reposition the damper in order to balance the air flow in the duct and the terminal. While each damper assembly in a VAV system is designed as a self-powered, stand alone unit, the individual damper assemblies installed in a VAV system could be connected and networked through a central control system. This would allow the control system to monitor the balancing damper status and reinitiate balancing if required.

The present invention is also directed to a system for balancing an air distribution system. The system comprises an air distribution system including a source of conditioned air; a plurality of air terminal devices; a plurality of branch ducts, each branch duct terminating in one of the air terminal devices; and a main duct interconnecting the source and the plurality of branch ducts. The system also includes a plurality of air balancing assemblies each individually associated with a particular branch ducts. Each air balancing assembly includes an airflow control device in the particular branch duct; means for determining the airflow setpoint for the particular branch duct associated with the air balancing assembly; means for generating power from airflow through the particular branch duct; means, associated with the generating means, for storing the generated power; and means, associated with the storage means, for monitoring the amount of stored power. The airflow control device also includes means, associated with the monitoring means, for initiating operation of the air balancing assembly when the amount of stored power is sufficient for operation; means for measuring airflow in the particular branch duct; means, associated with the measuring means and the airflow setpoint determining means, for comparing the measured airflow to the airflow setpoint and determining an error signal; and means, associated with the comparing and determining means, for modulating an airflow control device in the particular branch duct to reduce the error signal.

Additionally the present invention is directed to a method of balancing an air distribution system. The air distribution system includes a source of conditioned air, a plurality of branch ducts each terminating in an air terminal device, an air balancing assembly in at least some of the plurality of branch ducts, and a main duct interconnecting the source and the plurality of branch ducts. The method comprises the steps of: determining an airflow setpoint for an individual branch duct; generating power from airflow through the individual branch ducts; storing the generated power; monitoring the amount of stored power; initiating balancing when the stored power is sufficient for operation of the air balancing assemblies; measuring airflow in the branch duct; comparing the measured airflow to the airflow setpoint; determining an error signal responsive to the comparing step; modulating a damper in the particular branch duct to reduce the error signal.

BRIEF DESCRIPTION OF THE DRAWINGS

FIG. 1 is a schematic representation, depicting both mechanical and electrical components, of a balancing damper assembly in accordance with the present invention depicted in conjunction with a schematic representation of the supply side of a VAV system;

DETAILED DESCRIPTION OF THE DRAWINGS

Figure 2:
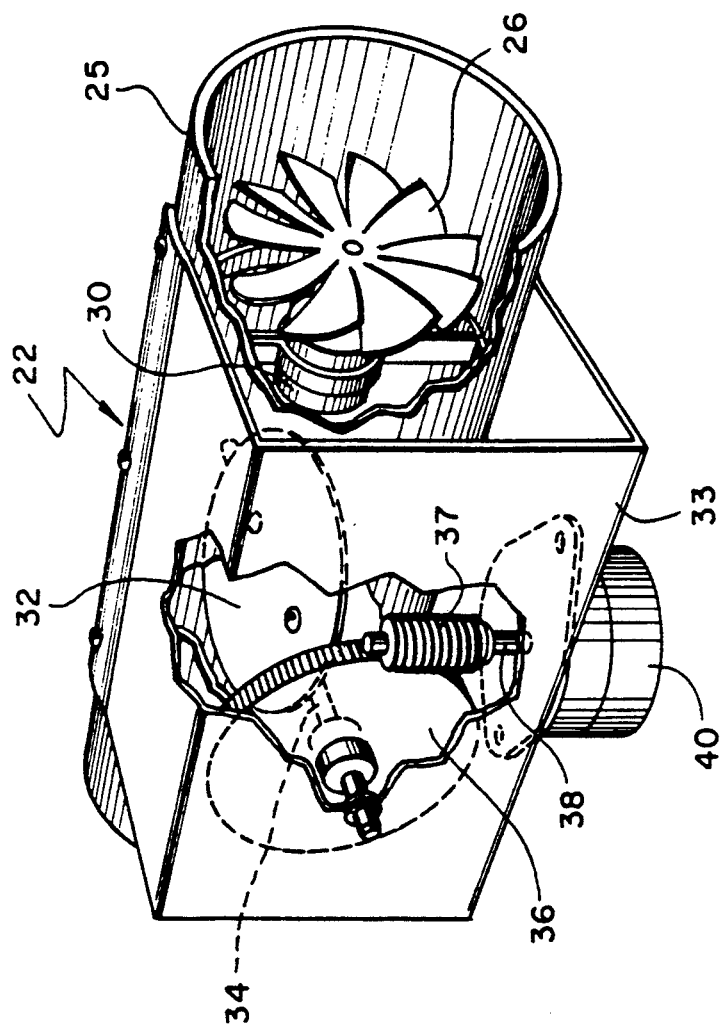
FIG. 2 is a side perspective view of a damper assembly in accordance with the invention with a portion broken out to expose the damper and drive mechanism of the damper assembly.
Figure 3:
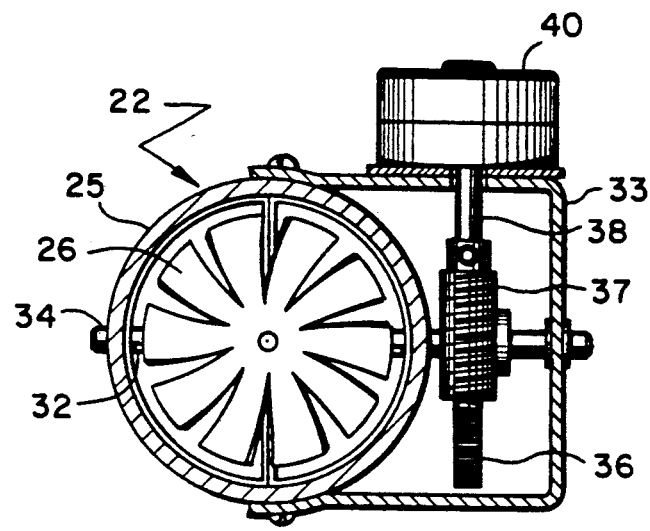
FIG. 3 is a sectional end view of the damper assembly where the motor is in a plane perpendicular to the plane of the gear train.

The automatic, self-balancing air damper assembly 10 in accordance with the present invention is depicted schematically in FIG. 1. The assembly 10 is designed to be utilized with a variable air volume (VAV) ventilation system of a building, the supply side of a VAV system 11 also being depicted schematically in FIG. 1. The VAV system 11 includes a source of conditioned air 12 that may be either cooling or heating equipment. The conditioned air from the conditioned air source 12 is provided to the building through a series of ducts.

The duct system consists of a main duct 14 that carries all of the conditioned air from the conditioned air source 12. A plurality of submain ducts 16 pick up respective portions of the air provided by the main duct 14. The submain ducts 16 in turn split the conditioned air amongst a number of branches 18. Each branch 18 services a terminal 20. Each terminal 20 discharges conditioned air into a respective zone 21 of the building.

The damper assembly 10 includes a duct assembly 22 and a control unit 24. The duct assembly 22 includes a duct pipe 25 adapted for insertion into a duct of a VAV system 11, preferably in a branch duct 18 in close proximity to a terminal 20 in order to control the flow of air that is delivered by the terminal 20. The terminal 20 may include an air valve such as are shown by U.S. Pat. Nos. 4,838,483; 4,775,133; 4,749,000 and 4,749,001; all of which are commonly assigned to the assignee of the present invention and all of which are hereby incorporated by reference.

An air turbine 26 is mounted in the duct pipe 25 so that air flow through the duct pipe 25 rotates the turbine 26. The turbine 26 is connected by a conventional shaft 28 to a generator 30. Rotation of the air turbine 26 by air flowing through the duct causes the production of a voltage in the generator 30.

A damper 32 is mounted downstream of the turbine 26 and the generator 30 within the duct pipe 25. The damper 32 is capable of being modulated between open and closed positions to vary the amount of air flow through the duct pipe 25. The position of the damper 32 ultimately sets the balance of the branch 18 in the VAV system 11 by controlling the amount of air flow that passes through the terminal 20.

Figure 4:
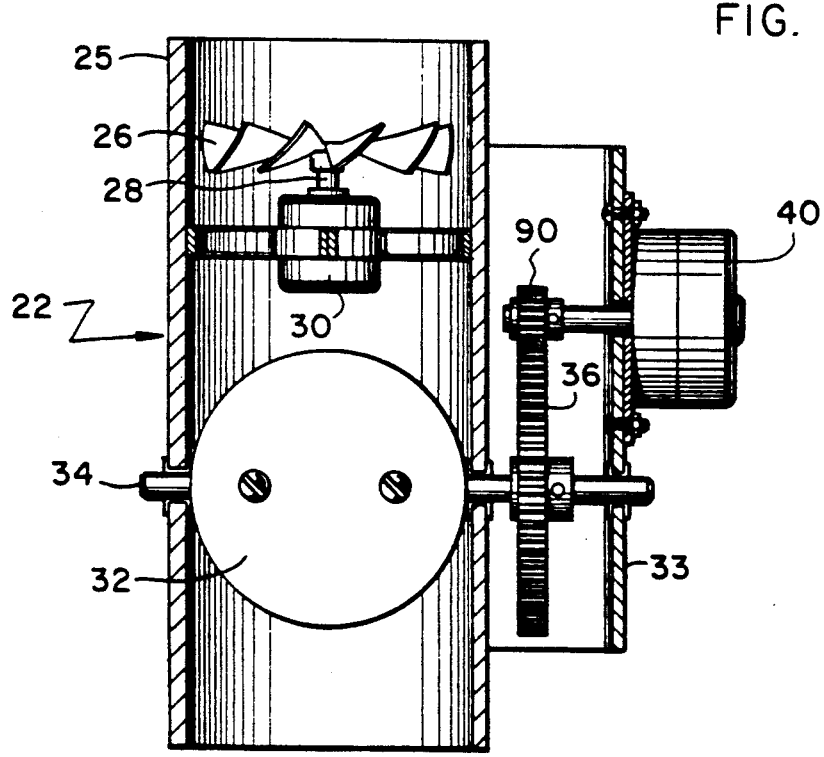
FIG. 4 is a sectional top view of the damper assembly where the motor is in the same plane as the gear train.

The duct assembly 22 includes a fixed tool duct housing 33. The housing 33 contains a gear train 36 and its associated motor 40. The motor 40 is connected to the gear train 36 by a shaft 38 which includes an endless screw 37. The gear train 36 in turn is connected to the damper 32 by a shaft 34, such that rotation of the shaft 38 and the endless screw 37 by the motor 40 produces a rotation in the gear train 36. The gear train 36 reduces this rotational input and drives the damper 32 to the desired position. The motor 40 is a bi-directional motor which permits the motor 40 to rotate in either direction thereby providing opening and closing motion for the damper 32. In the preferred embodiment shown in FIG. 4, the shaft 38 includes a gear 90 in the same plane as the gear train 36, and the motor 40 is also in the same plane as the gear train 36.

The damper assembly 10 is designed to be self-powered. Since the cost and labor of providing external power to the damper assembly is prohibitive particularly in view of the limited periods of activity by the damper assembly 10. To accomplish this, the turbine 26 and the generator 30 operate in two distinct modes. In the unloaded mode, the generator 30 is connected only to a flow velocity indicator 44, which does not provide a significant electrical load on the generator 30. Since essentially no load is imposed, the turbine 26 freely rotates responsive to the air flow in the duct 25. In its loaded mode, a switch 45 is thrown to connect the generator 30 to a power storage unit 46. The power storage unit 46 imposes a load on the generator 30, which in turn reduces the ability of the turbine 26 to freely rotate in the air flow in the duct 25.

The power storage unit 46 is typically a capacitor which is charged and maintained in a charged state by the rotation of the turbine 26 when the turbine 26 and the generator 30 are operating in the loaded condition. The power available from the power storage unit 46 is utilized to power both the control unit 24 and the motor 40. Alternatively, the power storage unit 46 could be a storage battery or other power storing device.

The control unit 24 can be carried directly on the duct assembly 22 or, alternatively, can be mounted at a convenient location such as within the space 21. Two manual inputs are available to set and operate the control unit 24. A set point control 48 can be manually adjusted to provide a signal representative of the design air flow that is desired through the branch 18 and the terminal 20 into the zone 21. The second manual input is a manual reset 50. The manual reset 50 can be utilized to give an initiation signal to commence or recommence the balancing function for a fixed period of time.

An air flow comparator 52 compares the signal from the set point control 48 with the signal provided by the flow velocity indicator 44 to generate an error signal. The error signal is sent to an error amplifier 54 where the magnitude of the signal is amplified and sent to a drive control 58. The drive control 58 receives commands from an implement logic 56 and receives power from the power storage unit 46. The drive control 58 is electrically connected by wires 60 to the motor 40.

In operation, a plurality of individual balancing air damper assemblies 10 are respectively associated with all of, or a preselected number of, the terminals 20 in a ventilation system in order to provide self-balancing for the entire system. To commence self-balancing, service personnel set the desired set point controls 48 of individual assemblies 10, and then initiate the balancing function of each assembly 10 by selecting manual reset 50. In practice, the damper assemblies 10 may be each connected to a central control system (not shown), such that set point control 48 and manual reset 50 may be remotely controlled to facilitate initiating the balancing function without having to remove ceiling panels and the like.

As previously indicated, the set point 48 is representative of the design air flow that is desired into a particular zone 21. Such a value is typically arrived at when the building ventilation system is designed. The set point control 48 may also require adjustment responsive to usage change in the various zones of the ventilation system of the building. For example, installing equipment that generates heat in a particular zone 21 will require increasing the air flow to that particular zone in order to maintain a desired temperature range.

The manual reset 50 provides a command to the control logic 56 to commence balancing operations. The control logic 56 can be implemented using a conventional microprocessor, or electronic logic circuitry. A timing function is stored in the control logic 56 that will cease balancing operations after the airflow in the duct pipe 25 has approximated the set point 48 for a set period of time. The timing function is employed to terminate the balancing operation and provide normal VAV system control. Initially, the control logic 56 monitors the power level of the power storage unit 46 by means of a power level monitor 68 determines if the power storage unit 46 has adequate power to drive the motor 40 and the gear train 36 so as to reposition the damper 32 as necessary. By means of actuator 70, the control logic 56 causes the switch 45 to connect the power storage 46 to the generator 40 when the power level is low. When so connected, the generator 30 produces electrical power through the rotation of the turbine 26, thereby recharging the power storage unit 46.

The control logic 56 positions the switch 45 to the no load mode when the energy level of the power storage unit 46 is at an operational level. In the no load mode, the turbine 26 freely rotates as a result of impingement of the air flow through the duct 25 on the turbine 26. The rotational velocity of the turbine 26 in the unloaded mode is proportional to the velocity of the air flow in the duct 25. Accordingly, the voltage generated by the generator 30 in the no load mode is also representative of the air flow in duct 25. This voltage is provided to the flow velocity indicator 44. The flow velocity indicator 44 provides a velocity signal to the air flow comparator 52 that is representative of the flow velocity in the duct 25.

The airflow comparator 52 compares the velocity signal to the set point signal 48 and generates an output signal. The output signal may be either positive or negative depending upon whether air flow needs to be increased or decreased in the duct 25 in order to match the set point signal. The sign of the output signal determines whether the damper 32 is opened or closed in order to provide the necessary balancing.

The output signal from the airflow comparator 52 is provided to the error amplifier 54, where amplification of the signal is performed. The amplified signal is provided to the drive control 58. The drive control 58 uses this signal to generate a power command to the motor 40. In practice, the power command drives the motor 40 a fixed amount toward the direction necessary to achieve the desired position of the damper 32 through the gear train 36. Similarly, the gear train 36 effects the desired position change in the damper 32. This provides the iterative balancing action required without instability in the system.

With the damper 32 in the desired position to achieve a balanced air flow condition, the control logic 56 again causes the switch 45 to be connected to the flow velocity indicator 44. This action puts the turbine 26 and the generator 30 in the no load condition once again. As flow stabilizes in the duct 25, the turbine 26 will provide an updated signal to the flow velocity indicator 44 representative of the new airflow in the duct 25. If this signal is determined by the air generator 52 to exactly match the set point 48 for the set period of time, the balancing function is complete. More likely, the updated flow velocity signal will not match the set point 48 or the airflow through the duct pipe 25 will change in response to the actions of the plurality of other duct assemblies 10. In such case, the iterative balancing process continues. Each iteration will position the damper 32 to a position that more nearly effects the air flow desired in the duct 25.

The control logic 56 will shut down the control unit 24 after a fixed period of time. At this point, service personnel can take accurate measurements of the air flow at the terminal 20. If the air flow is within design specifications, no further action is taken. If the air flow at the terminal 20 is not within design requirements, the manual reset 50 can again be actuated and another series of iterative balancing functions will be performed. Since an air flow volume change in a specific terminal 20 is interactive to some degree with all other terminals 20, it can be seen that the total balancing of the ventilation system will be a highly iterative process. It will be appreciated, however, that the simultaneous balancing of all of the individual damper assemblies will minimize the number of such iterations and the entire ventilation system will be balanced without the need for iterative physical access to each of the air damper assemblies.

It should be realized that the plurality of individual damper assemblies 10 each remain dormant until the source of conditioned air 12 is activated to provide airflow through the individual duct pipes 25. Consequently, all of the plurality of individual damper assemblies 10 can be caused to go from a dormant state to an operational state at essentially the same time.

What is desired to be secured by U.S. patents is set forth in the following claims.

I claim:

1. An automatic, self-balancing air damper assembly adapted for use with a building ventilation system, the ventilation system having a supply air source, a duct system connected to the supply air source at a first end and terminating in a plurality of terminals in the various spaces of the building and a fan for moving a volume of supply air from the air source through the duct system and out the terminals to the various spaces of the building, the air damper assembly comprising:

a supporting duct section adapted for air flow communication with said duct system;

damper means adjustable between an open position and closed position operably supported in the duct section for regulation of the volume of supply air flowing through the duct section;

sensor means operably coupled to the duct section for sensing actual air flow through the duct section, said sensor means including generator means responsive to the air flow through said duct section for generating an electrical signal;

control means operably coupled to the sensor means for comparing the actual air flow through the duct section to a predetermined design air flow and generating an error signal representative of the difference between the actual air flow and design air flow, said control means including actual air flow indicator means responsive to said electrical signal for providing an actual air flow signal and means for providing a design air flow signal representative of said design air flow, said error signal generation means comparing said actual error signal to said design air flow signal to provide said error signal, said control means including electrical energy storage means for accumulating and storing the energy of the electrical signal generated by said generator means, said actuation means including motor means selectively coupleable to said storage means for adjustable positioning of said damper; and actuation means operably coupled to the control means and to the damper means for adjustably positioning said damper between said open and closed positions responsive to said error signal whereby said actual air flow is brought into registration with said design air flow.

2. The invention as claimed in claim 1, including switch means operably coupled to said generator means for selectively, alternatively coupling said generator means to either said air flow indicator means or said storage means.

3. The invention as claimed in claim 2, said sensor means comprising a rotatable turbine oriented in said duct section for rotation by the air flow passing through said duct section.

4. The invention as claimed in claim 2, said control means further including reset means for generating an initiation command and implementation logic means for commencing a timed cycle of operations responsive to the initiation command, the cycle of operations including storing electrical energy produced by the generator means until adequate energy is accumulated in the storage means for adjusting said damper, monitoring the air flow indicator means and providing said error signal, powering the actuation means to reposition the damper responsive to the error signal, repeating the monitoring of the air flow and repositioning the damper until the actual air flow signal correlates to the design air flow signal, and terminating operations after a predetermined period of time has elapsed.

5. A system for balancing an air distribution system comprising:

an air distribution system including;

a source of conditioned air;

a plurality of air terminal devices;

a plurality of branch ducts, each branch duct terminating in one of the air terminal devices; and a main duct interconnecting the source and the plurality of branch ducts;

a plurality of air balancing assemblies each individually associated with a particular branch ducts, each air balancing assembly including;

an airflow control device in the particular branch duct;

means for determining the airflow setpoint for the particular branch duct associated with the air balancing assembly;

means for generating power from airflow through the particular branch duct;

means, associated with the generating means, for storing the generated power;

means, associated with the storage means, for monitoring the amount of stored power;

means, associated with the monitoring means, for initiating operation of the air balancing assembly when the amount of stored power is sufficient for operation;

means for measuring airflow in the particular branch duct;

means, associated with the measuring means and the airflow setpoint determining means, for comparing the measured airflow to the airflow setpoint and determining an error signal; and means, associated with the comparing and determining means, for modulating an airflow control device in the particular branch duct to reduce the error signal.

6. The system of claim 5 further including means, associated with the comparing and determining means, for ceasing operation of the air balancing assembly when the error signal has been minimized for a predetermined time period.

7. The system of claim 6 further including means, operatively associated with the air balancing assembly for reactivating the air balancing assembly in response to an external signal.

8. The system of claim 5 further including means responsive to the airflow measuring means for initiating operation of the air balancing assembly in response to airflow.

9. The system of claim 5 wherein the generating means and the airflow measuring means comprise an air turbine device.

10. A method of balancing an air distribution system, the air distribution system including a source of conditioned air, a plurality of branch ducts each terminating in an air terminal device, an air balancing assembly in at least some of the plurality of branch ducts, and a main duct interconnecting the source and the plurality of branch ducts, the method comprising the steps of:

determining an airflow setpoint for an individual branch duct;

generating power from airflow through the individual branch ducts;

storing the generated power;

monitoring the amount of stored power;

initiating balancing when the stored power is sufficient for operation of the air balancing assemblies;

measuring airflow in the branch duct;

comparing the measured airflow to the airflow setpoint;

determining an error signal responsive to the comparing step;

modulating a damper in the particular branch duct to reduce the error signal.

11. The method of claim 10 including the further step of ceasing operation of the air balancing assembly when the air signal has been minimized for a predetermined time period.

12. The method of claim 11 including the further step of reactivating the air balancing assembly in response to an external signal.

13. The method of claim 10 including the further step of initiating operation of the air balancing assembly in response to the commencement of airflow in the particular branch duct.

* * * * *